United States Patent
Patel

(10) Patent No.: US 6,349,314 B1
(45) Date of Patent: Feb. 19, 2002

(54) ADAPTIVE SCHEDULER FOR MARK AND SWEEP GARBAGE COLLECTION IN INTERACTIVE SYSTEMS

(75) Inventor: Mark Armin Patel, Highland Park, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/408,428

(22) Filed: Sep. 29, 1999

(51) Int. Cl.$^7$ .............................................. G06F 17/30
(52) U.S. Cl. ...................................... 707/206; 711/165
(58) Field of Search ................................ 707/206, 103; 709/100, 104, 106; 711/165, 159, 160, 206, 103; 717/5, 9

(56) References Cited

U.S. PATENT DOCUMENTS

| | | | |
|---|---|---|---|
| 5,088,036 A | * 2/1992 | Ellis et al. | 707/206 |
| 5,241,673 A | 8/1993 | Schelvis | 707/103 |
| 5,446,901 A | 8/1995 | Owicki et al. | 200/5 A |
| 5,560,003 A | * 9/1996 | Nilsen et al. | 707/206 |
| 5,790,778 A | 8/1998 | Bush et al. | 714/38 |
| 5,799,185 A | 8/1998 | Watanabe | 707/206 |
| 5,819,299 A | 10/1998 | Bejar | 707/206 |
| 5,845,298 A | 12/1998 | O'Connor et al. | 707/206 |
| 5,857,210 A | 1/1999 | Tremblay et al. | 707/206 |
| 5,873,105 A | 2/1999 | Tremblay et al. | 707/206 |
| 5,903,899 A | 5/1999 | Steele, Jr. | 707/206 |
| 6,052,699 A | * 4/2000 | Huelsbergen et al. | 707/206 |
| 6,065,020 A | * 5/2000 | Dussud | 707/206 |
| 6,101,580 A | * 8/2000 | Agesen et al. | 711/132 |
| 6,226,761 B1 | * 5/2001 | Berstis | 714/37 |
| 6,247,027 B1 | * 6/2001 | Chaudhry et al. | 707/206 |
| 6,289,360 B1 | * 9/2001 | Kolodner et al. | 707/206 |

OTHER PUBLICATIONS

Roger Henriksson, Dept. of Computer Science, Lund University, May 1996, "Adaptive Scheduling of Incremental Copying Garbage Collection for Interactive Applications", pp. 1–8.

Roger Henriksson, Dept. of Computer Science, Lund University, Jun. 1994, "Scheduling Real Time Garbage Collection", pp. 1–14.

* cited by examiner

*Primary Examiner*—Sanjiv Shah
(74) *Attorney, Agent, or Firm*—Michael C. Soldner; Randall S. Vaas

(57) ABSTRACT

An adaptive garbage collection scheduler (42) in an interactive system (10) to schedule invocation of a mark and sweep garbage collection process. The adaptive garbage collection scheduler (42) determines a user impact index (I), corresponding to the effect of the garbage collection process on a user (22), and a collection urgency index (U), corresponding to how urgently the garbage collection process needs to be run. The garbage collection process is invoked by the adaptive garbage collection scheduler (42) when the collection urgency index (U) is greater than the user impact index (I).

15 Claims, 3 Drawing Sheets

ADAPTIVE SCHEDULER FOR MARK AND SWEEP GARBAGE COLLECTION IN INTERACTIVE SYSTEMS

FIELD OF THE INVENTION

The present invention relates generally to memory management in an interactive system, and in particular, the present invention relates to adaptive scheduling of a mark and sweep garbage collection process in an interactive system.

BACKGROUND OF THE INVENTION

Efficient use of memory and memory management strategies are important factors to be considered in an interactive system that utilizes a programming language with automatic memory management, such as Java for example. In such an interactive system, certain portions of memory are allocated to define objects, such as mouse events, user interface components, database records, and so forth, to enable those objects to be stored. Since the amount of memory of the system is limited, it is important to identify and reclaim memory allocated to obsolete objects, or previously defined objects that are no longer required for use by existing objects, in order to enable the memory associated with the obsolete objects to be re-used to perform other functions, such as creating new objects. This process of identifying and reclaiming memory previously allocated to objects that have become obsolete is commonly referred to as "garbage collection". Implementation of the garbage collection process is typically accomplished using a garbage collection algorithm.

One such conventional garbage collection algorithm, referred to as mark and sweep garbage collection, involves the combined operation of a mark phase and a sweep phase. During operations of the system, a tree of objects, starting at a root object that is retained while the system is running, is stored in the system memory. During the mark phase, the tree is traversed, and all objects that are part of the tree are marked as being in use. Base objects, or root objects of trees are identified or marked as not being garbage and therefore not to be collected. Relationships between the root objects and all secondary objects referenced by the root objects are defined. By being part of a tree, secondary objects that are implicitly referenced by a root object of the tree are required for use by that root object and are therefore be marked so as not to be collected. On the other hand, any secondary objects that are not implicitly referenced by an object of the tree are not required for use and are therefore left unmarked. Once the mark phase is completed, it is assumed that any unmarked object in memory is no longer referenced and is therefore garbage that can be collected. During the sweep phase that follows, enumerated objects in memory that are unmarked are deallocated to enable the corresponding memory to be recovered and reused.

In order to ensure accuracy in the marking of objects during the mark phase, changes to the tree cannot be allowed to occur while the mark operation is performed. If changes were to take place during the mark operation, objects could possibly be incorrectly marked as being in use when they are no longer referenced, or left unmarked when in fact they are referenced and therefore should be marked as objects in use. As a result, all threads or operations of the system, other than the one performing garbage collection, must be halted during the garbage collection operation to ensure that the tree remains stable and the mark phase is accurate.

A user of an interactive system tends to have certain expectations of how quickly the system responds when certain input events are performed, and these expectations vary between input events. For example, a user will typically expect an instantaneous response from the system when performing certain input commands, such as during input events relating to the creation or editing of text, scrolling through a list, playing a game, and so forth. On the other hand, the user will not expect instantaneous response from the system during other input events, such as switching between screens or programs, for example.

Conventional interface devices that employ a mark and sweep garbage collection operation include an algorithm for determining when to perform the garbage collection process. Conventional algorithms are designed to invoke the mark and sweep garbage collection either after a certain amount of memory has been allocated or after less than a certain amount of memory is free or available. Since memory allocation tends to be unpredictable, it is possible that the garbage collection process of the conventional interface device will be invoked at any time, including during those time periods when the user is performing an input event for which there is a user expectation of instantaneous response from the system.

For example, due to the non-deterministic nature of memory allocation, it is possible that the garbage collection process of conventional interface devices could sometimes take place while the user is scrolling through a list. As a result, for reasons described above, all threads or operations, including operations associated with the scrolling operation being performed by the user, must necessarily be stopped to enable the garbage collection process to be performed. This halting of operations associated with the scrolling performed by the user will directly impact the user since the scrolling will be momentarily halted, contradicting user expectations of an instantaneous response from the system. As a result, the user will tend to view the garbage collection process as an unacceptable and annoying interruption that corrupts user expectations and enjoyment of the system.

Accordingly, what is needed is a garbage collection scheduling scheme that lessens the impact of the garbage collection process on the user.

DETAILED DESCRIPTION OF THE PREFERRED EMBODIMENT

Figure 1:
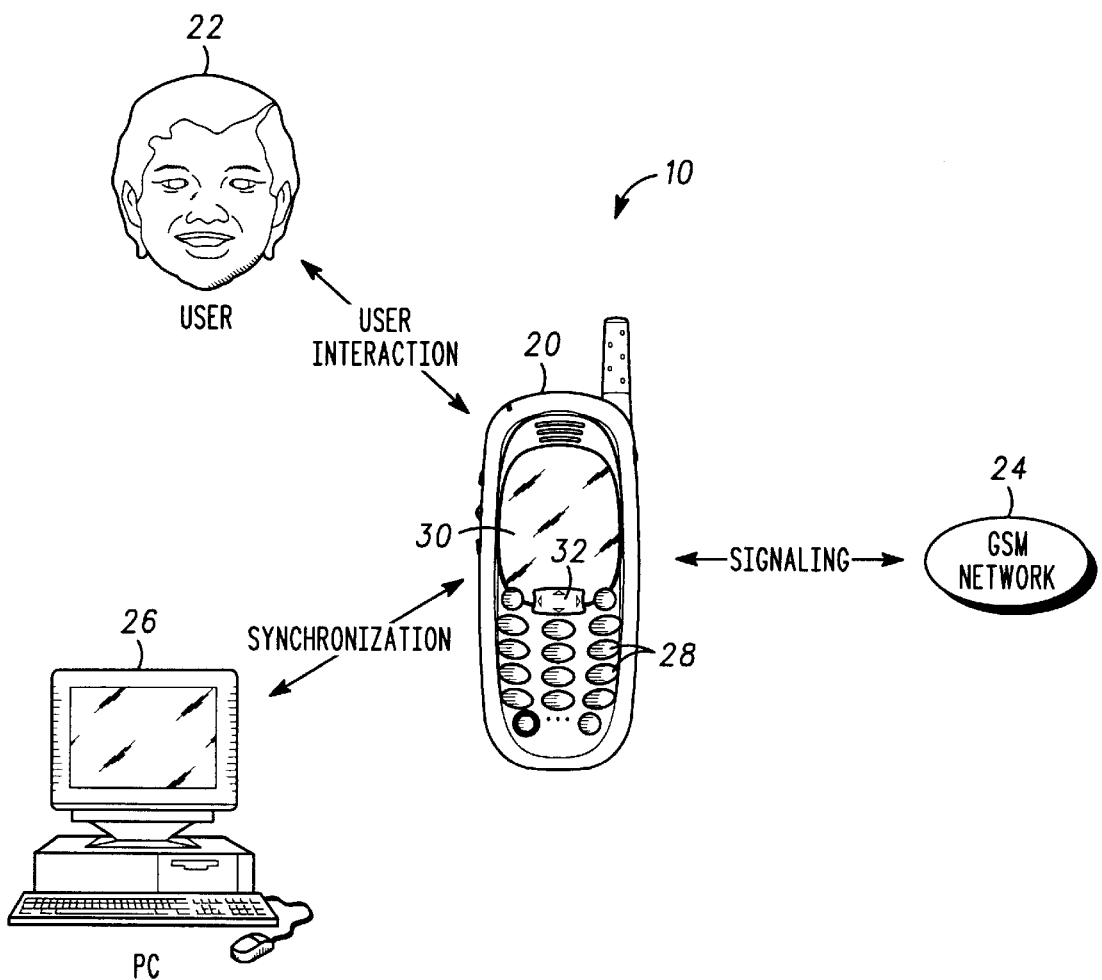
FIG. 1 is a schematic diagram of an interactive system for implementing the adaptive scheduling for mark and sweep garbage collection according to the present invention.

FIG. 1 is a schematic diagram of an interactive system 10 implementing adaptive scheduling for mark and sweep garbage collection according to the present invention. The interactive system 10 includes, for example, an interface device 20, such as a cellular phone, that interfaces with one or more external devices, including a user 22, a global system for mobile communication ("GSM") network 24, and a personal computer ("PC") 26. The interface device 20 includes various input keys 28, including a scroll key 32, along with a display portion 30 for displaying an image.

Figure 2:
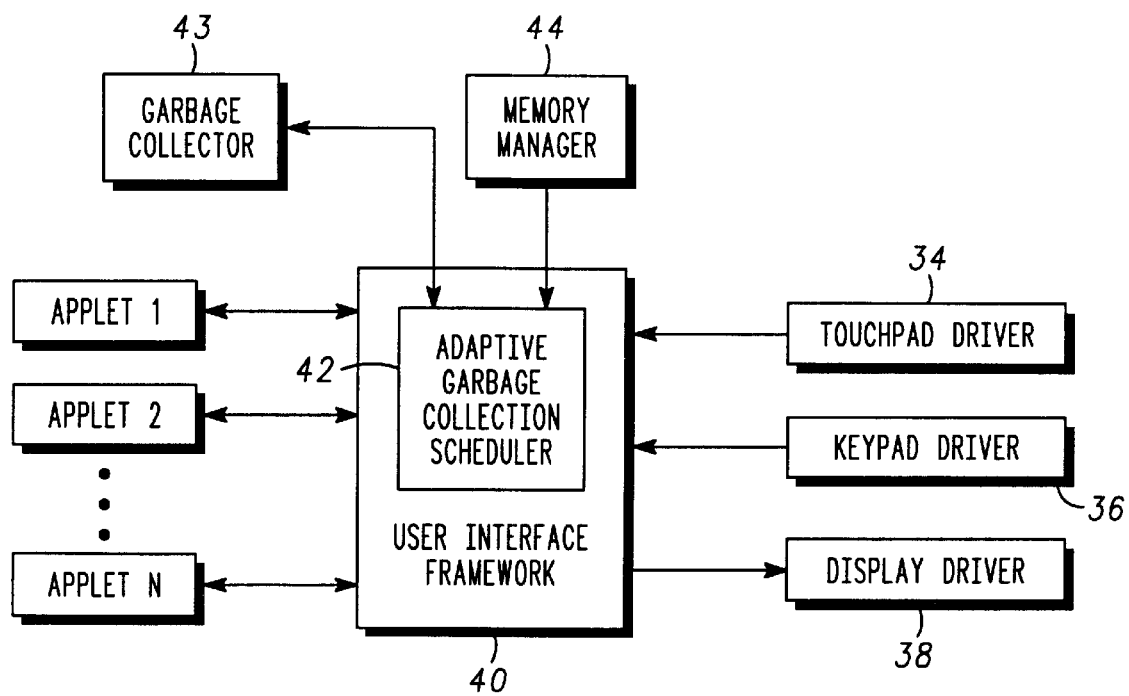
FIG. 2 is a block diagram of functional units located within an interface device of the interactive system of FIG. 1.

FIG. 2 is a block diagram of functional units located within the interface device 20 of the interactive system 10 of FIG. 1. As illustrated in FIG. 2, the interface device 20 includes a touchpad driver 34, a keypad driver 36, a display driver 38, a user interface framework 40, an adaptive garbage collection scheduler 42, a garbage collector 43, and a memory manager 44. As illustrated in FIGS. 1 and 2, the user 22 interacts with the interface device 20 by pressing input keys 28, or by using a pointer (not shown) to touch a screen portion or touchpad (not shown) located on the display portion 30 of the interface device 20, and scrolls through a display on the display portion 30 using the scroll key 32. In this way, touchpad events, or user inputs associated with touching of the touchpad of the display portion 30, are generated by the touchpad driver 34, while keypad events, or user inputs associated with pressing of the input keys 28, are generated by the keypad driver 36.

Both the touchpad events and the keypad events are passed from the touchpad driver 34 and the keypad driver 36, respectively, to the user interface framework 40. The user interface framework 40 determines which of applet 1 through applet n, or which component or object within applet 1 through applet n should receive the event, based on either a current key focus associated with the touching of the input keys 28, or on a screen location of the display portion 30 associated with the touchpad event.

Since the user interface framework 40 is a bottleneck for all input events, the user interface framework 40 measures the amount of time required for applet 1 through applet n to handle each event, and passes this information to the adaptive garbage collection scheduler 42 embedded in the user interface framework 40 of the interface device 20. Likewise, the applet of applet 1 through applet n that handles the event is aware of both the action to be performed as a result of the input event and how long the user is willing to wait for that action to be completed. This information is also passed from applet 1 through applet n to the adaptive garbage collection scheduler 42. In addition, the garbage collector 43 informs the adaptive garbage collection scheduler 42 of the amount of time necessary for the garbage collector 43 to perform the garbage collection process, and the memory manager 44 provides the adaptive garbage collection scheduler 42 with information associated with memory allocation and usage.

The adaptive garbage collection scheduler 42 of the present invention determines a user impact of running the garbage collection process as part of each user input by combining the information related to the action to be performed as a result of the input event and how long the user is willing to wait for that action to be completed, which is provided by applet 1 through applet n, with the information related to garbage collection execution time provided by the garbage collector 43. In addition, the adaptive garbage collection scheduler 42 determines how urgently the garbage collection process needs to be run based on the memory allocation and usage information provided by the memory manager 44. The adaptive garbage collection scheduler 42 then compares the user impact of running the garbage collection process with how urgently the garbage collection process needs to be run to determine whether to invoke the garbage collection process, as will be described below.

As illustrated in FIG. 1, the interface device 20 interfaces with the GSM network 24 by receiving signals through an antenna (not shown), such as an incoming call or a new SMS message from the GSM network 24, and responds to and transmits signals to the GSM network 24 through the network driver 38. Similarly, the interface device 20 and the PC 26 interface to synchronize phone numbers and other information, for example, through the network driver 38.

In certain operations during which the user 22 interfaces with the interface device 20, the user 22 has expectations as to how quickly the interface device 20 responds to the corresponding user inputs. For example, when scrolling through a list displayed on the display portion 30 of the interface device 20, the user 22 tends to expect that the items on the display portion 30 will move in a quick, smooth, and instantaneous manner as the scroll key 32 is depressed. In the same way, when the user types text by pressing the input keys 28, the user has expectations that the interface device 28 with respond instantaneously to each key stroke so that typing of the text is smooth and uninterrupted. If the user is unable to scroll through the list quickly, or when a display does not instantaneously respond by moving along the screen as the user 22 presses the scroll key 32, or if the input keys 28 do not respond instantaneously during typing of text, the expectations of the user 22 have not been fulfilled. This failure of the interactive system 10 to operate in accordance with user 22 expectations causes the user 22 to become irritated, thereby corrupting the perceived integrity and user enjoyment of the interactive system 10.

In the same way, in order to ensure that valuable data transmitted between the interface device 20 and either the GSM network 24 or the PC 26 is not lost or corrupted, it is important that the interface device 20 responds promptly to certain signals that are received from the GSM network 24, and to requests for data that are received from the PC 26, while at the same time minimizing the impact on the user expectations.

Figure 3:
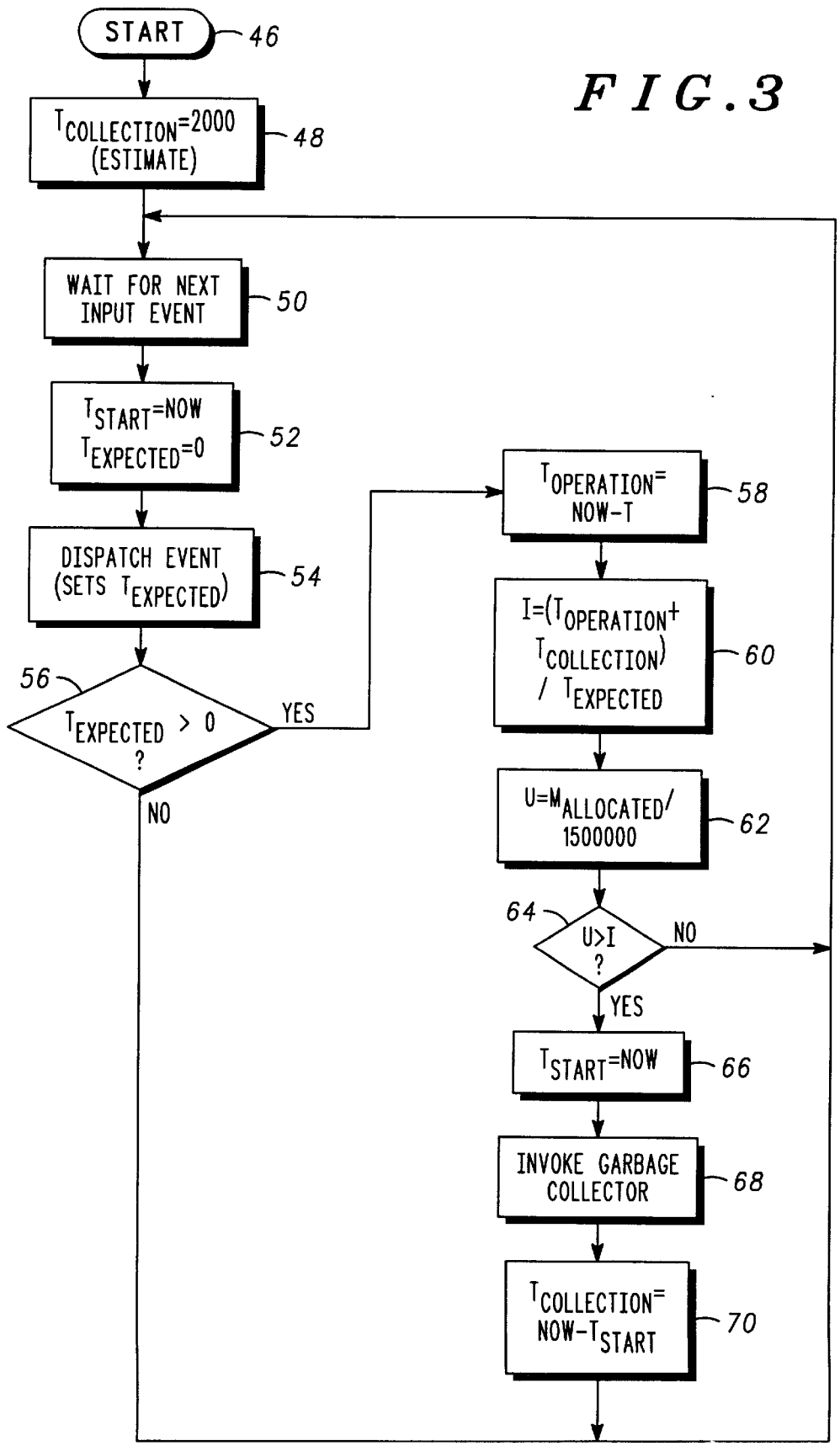
FIG. 3 is a flowchart of operation of adaptive scheduling for mark and sweep garbage collection according to the present invention.

FIG. 3 is a flowchart of a method of adaptive scheduling for mark and sweep garbage collection according to the present invention. The present invention lessens the impact of the garbage collection process on the user 22 by taking both the current memory usage and state of the interface device 20 into account. As illustrated in FIGS. 2 and 3, after start up of the interface device 20 in step 46 of the present invention, the amount of time required to perform the garbage collection process, $t_{collection}$ is set in step 48 to an initial default value of two seconds, corresponding to the time typically associated with a mark and sweep garbage collection scheme. This default value is arbitrary and can be set as any value which the interactive system 10 or a specific application may require. The interface device 20 then waits in step 50 for an input event to occur, such as a notification received over the GSM network 24, or an action that involves changes to the interface device 20 initiated by a user input, such as through the input keys 38 or the scroll key 32. When an input event occurs, a start time, $t_{start}$ is set to now in step 52, and the amount of time that the user 22 expects the input event to take, $t_{expected}$ is initialized as zero.

As described above, during certain input events the user 22 has an expectation that the interface device 20 will respond instantaneously, such as when the user 22 is playing a game, scrolling through a document or inputting characters to form a document using the input keys 38. Since an instantaneous response is expected by the user 22 during these input events, the time that the user 22 would expect these input events to take, $t_{expected}$) would not be greater than zero.

On the other hand, during other input events, such as when changing applications or moving between screens displayed on the display portion 30 of the interface device 20, interaction between the user 22 and the interface device 20 is momentarily halted as information is processed, and therefore the user 22 does not have expectations that the response of the interface device 20 will be instantaneous. Since an instantaneous response is not expected by the user 22 during these input events, the time that the user 22 would expect these input events to take, $t_{expected}$, would be greater than zero.

Once $t_{start}$ and $t_{expected}$ are set in step 52, a dispatch event that corresponds to the handling of the input event of step 50, or the sending of the event to an object necessary to handle the input event, is performed in step 54. This dispatch event therefore includes the determination by the user interface framework 40 of which applet or objects within an applet of applet 1 through applet n should receive the event. In addition, $t_{expected}$ is set in step 54 to correspond to the amount of time that the user 22 would typically expected the input event to take, which is provided by the applet that handles the event. A determination is then made in step 56 as to whether the amount of time that the user 22 would expect the input event to take, $t_{expected}$, is greater than zero.

Therefore, if it is determined at step 56 that $t_{expected}$ is not greater than zero, i.e., that the user 22 has expectations of an instantaneous response from the interface device 20, the interface device 20 does not perform the garbage collection process and returns to step 50 to wait for the next input event. If a determination is made at step 56 that $t_{expected}$ is greater than zero, i.e., that the user 22 does not have expectations of instantaneous response from the interface device 20, the amount of time associated with completing an operation corresponding to the input event, $t_{operation}$, is determined by the user interface framework 40 in step 58 by subtracting $t_{start}$ set in step 52 from the current time. The user interface framework 40 then passes the value of $t_{operation}$ to the adaptive garbage collection scheduler 42.

The adaptive garbage collection scheduler 42 of the present invention then calculates a user impact index I in step 60 by dividing the sum of the amount of time associated with completing the operation corresponding to the input event, $t_{operation}$, supplied to the adaptive garbage collection scheduler 42, and the amount of time required to perform the garbage collection, $t_{collection}$, by the amount of time that the user 22 would expect the interface device 20 to take to perform the input event, $t_{expected}$. The user impact index I is thus a ratio of the total time required to both process the input event and to run the garbage collection process, to the delay expected by the user 22 for that input event, and therefore indicates how disruptive the garbage collection process would be to the user if it were run at that moment. The user impact index I is illustrated as Equation 1 below:

$$I = \frac{t_{operation} + t_{collection}}{t_{expected}} \quad \text{Equation 1}$$

A collection urgency index U, indicative of how urgently the garbage collection process needs to be run at this moment, is then calculated in step 62 using Equation 2 set forth below:

$$U = \frac{m_{allocated}}{\beta} \quad \text{Equation 2}$$

The amount of the memory that has been allocated to new objects since the last time the garbage collection process was invoked, $m_{allocated}$ is provided to the adaptive garbage collection scheduler 42 by the memory manager 44. As illustrated in Equation 2, the adaptive garbage collection scheduler 42 calculates the collection urgency index U by dividing the $m_{allocated}$ by a tuning constant $\beta$ for controlling how frequently the garbage collection process is invoked. The tuning constant $\beta$ can be varied according to the demands and requirements of the interactive system 10 to reflect the nature and corresponding usage patterns of the system 10. By reducing the value chosen for tuning constant $\beta$, the garbage collection process will be invoked more frequently, and the probability that the garbage collection process will contradict user 22 expectations, and as a result be irritating to the user 22, will also increase. On the other hand, by increasing the value for tuning constant $\beta$, the garbage collection process will be invoked less frequently, although the probability that the garbage collection process will contradict user 22 expectations will also decrease. In the preferred embodiment of the present invention, a value of 1.5 megabytes was used as a value for tuning constant $\beta$.

The user impact index I and the collection urgency index U are compared by the adaptive garbage collection scheduler 42 in step 64 to determine if the urgency of the need for the garbage collection process to be invoked at this moment is greater than how disruptive the garbage collection process would be to the user if it were run at that moment. If the collection urgency index U is not greater than the-user impact index I in step 64, the garbage collector 43 is not invoked to perform the garbage collection process, the adaptive scheduling process returns to step 50 and the interface device 20 waits for the next input event.

On the other hand, if the collection urgency index U is greater than the user impact index U in step 64, the garbage collector 43 resets the start time $t_{start}$ to this moment in step 66, invokes the garbage collection process in step 68, and resets $t_{collection}$ in step 70 by subtracting $t_{start}$ set in step 66 from the moment when the garbage collection process is completed in step 68. The adaptive scheduling process then returns to step 50 and the interface device 20 awaits the next input event. In this way, the amount of time required for the garbage collector 43 to perform the garbage collection process $t_{collection}$ is reset in steps 66–70 to correspond to the actual time that was necessary to run the previous garbage collection process, replacing the default value initially set in step 48 and therefore more closely reflecting actual time periods associated with the garbage collection process.

Figure 4:
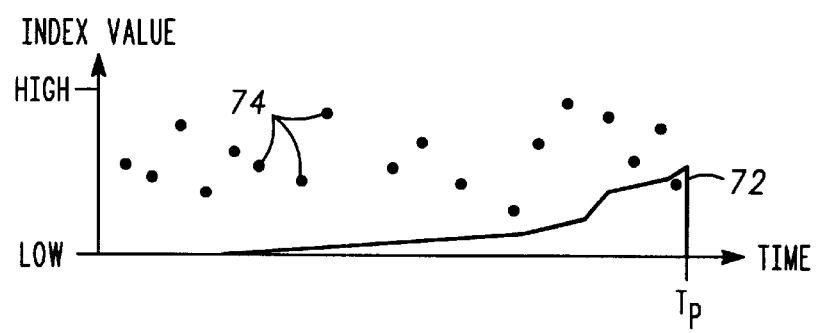
FIG. 4 is a graphic representation of a relationship between user index values and collection urgency index values over time.

FIG. 4 is a graphic representation of a relationship between user index values I and collection urgency index values U over time, calculated using Equations 1 and 2. After initial start up of the interactive system 10 or after the garbage collection process has been invoked, more and more memory space is occupied by objects corresponding to input events, and therefore, as illustrated in FIG. 4, a line 72 corresponding to the collection urgency index calculated using Equation 2 in step 62 increases with time. During this time period, more and more input events take place, each having corresponding user impact indices 74 that are calculated using Equation 1. The indices 74 range from a low index value, corresponding to those input events for which user 22 expectations as to responsiveness of the interactive system 10 are lowest, i.e., $t_{expected}$ is greater than zero, to a high index value, corresponding to those input events for which user 22 expectations of responsiveness of the interactive system 10 are greater, i.e., $t_{expected}$ approaches zero.

As illustrated in FIG. 4, the need for invocation of the garbage collection process increases over time as more and more memory space is occupied, until the line 72 corresponding to collection urgency index U eventually approaches an index value at time $t_p$ that is greater than the user impact index 74 at time $t_p$, meaning that the collection urgency index U is greater than the user impact index I.

In this way, as illustrated in FIGS. 3 and 4, the adaptive garbage collection scheduler 42 of the interface device 20 of the present invention first determines whether the external device, such as the user 22 has expectations of immediate response from the interface device 20 for each input event. When an input event is performed for which the user 22 does not have expectations of instantaneous response from the interface device 20, the user impact index I, corresponding to the effect that the garbage collection process would have on the user 22, and the collection urgency index U, corresponding to how urgently the garbage collection needs to be run, are compared. The user impact index I and the collection urgency index U are compared as each input event is performed, as illustrated in FIG. 4, and the garbage collection process is not invoked until the collection urgency index U is greater that the user impact index I.

By only invoking the garbage collection process in step 64 only when the collection urgency index U exceeds the user impact index I, in addition to determining, in step 56, that the user 22 does not expect instantaneous response to the input event from the interface system 20, the present invention provides an adaptive scheduler that accounts for both the impact that the garbage collection process will have on the user 22 and the amount of available memory in the interface device 20. As a result, the garbage collection process is invoked by the adaptive garbage collection scheduler 42 of the present invention only at moments when both user 22 expectations of the responsiveness of the interface device 20 are low and the necessity for garbage collection is high, resulting in a less intrusive invocation of the garbage collection process that is more responsive to expectations of the user 22.

While a particular embodiment of the present invention has been shown and described, modifications may be made. For example, it is understood that although the present invention has been described in terms of compensating for the expectations of the user, the present invention could also be used to compensate for periods when valuable data is transmitted between the interface device 20 and either the GSM network 24 or the PC 26. It is therefore intended in the appended claims to cover all such changes and modifications which fall within the true spirit and scope of the invention.

What is claimed is:

1. A method of invoking a garbage collection process in an interactive system, comprising:
    determining a user impact index corresponding to the impact of the garbage collection process on a user;
    determining a collection urgency index corresponding to the urgency of invoking the garbage collection process; and
    invoking the garbage collection process in response to the collection urgency index being greater than the user impact index.

2. The method of claim 1, wherein the user impact index corresponds to a ratio of a sum of operation time of an input event and time for performing the garbage collection process to a delay time expected by the user during the input event.

3. The method of claim 1, wherein the collection urgency index corresponds to a ratio of memory allocated since a previous invocation of the garbage collection process to a tuning constant corresponding to frequency of invocation of the garbage collection process.

4. The method of claim 3, wherein the tuning constant is approximately equal to 1.5 megabytes.

5. The method of claim 1, wherein the interactive system is a system that utilizes automatic memory management.

6. A method of invoking a garbage collection process in an interface device of an interactive system, comprising the steps of:
    identifying an input event for which time expected by a user for the interface device to perform the input event is greater than zero
    determining operation time for performing an operation corresponding to the identified input event;
    calculating a user impact index corresponding to a ratio of a sum of the determined operation time and time associated with performing the garbage collection process to the time expected by the user;
    calculating a collection urgency index corresponding to a ratio of memory allocated since a previous invocation of the garbage collection process to a tuning constant corresponding to frequency of invocation of the garbage collection process; and
    invoking the garbage collection process in response to the collection urgency index being greater than the user impact index.

7. The method of claim 6, wherein the tuning constant is approximately equal to 1.5 megabytes.

8. The method of claim 7, wherein the interactive system is a system that utilizes automatic memory management.

9. An apparatus for interfacing with an external device, comprising;
    a memory manager to track data corresponding to memory allocation and usage in the apparatus; and
    an adaptive garbage collection scheduler, the scheduler operable to determine a user impact index corresponding to the impact of a garbage collection process on the user, determine a collection urgency index corresponding to the urgency of invoking the garbage collection process, and invoking the garbage collection process in response to the urgency of invoking the garbage collection process being greater than the Impact on the external device.

10. The apparatus of claim 9, wherein the user impact index corresponds to the ratio of a sum of operation time of an input event and time for performing the garbage collection process to a delay time expected by the external device during the input event.

11. The apparatus of claim 10, wherein the collection urgency index corresponds to a ratio of memory allocated since a previous invocation of the garbage collection process to a tuning constant corresponding to frequency of invocation of the garbage collection process.

12. The apparatus of claim 11, wherein the tuning constant is approximately equal to 1.5 megabytes.

13. The apparatus of claim 9, further comprising:
    an input driver to transfer an input event performed by the external device to the apparatus;
    a plurality of applets to perform an operation associated with the input event and to provide the adaptive garbage collection scheduler with the delay time expected by the external device during the input event;
    a user interface framework to provide the adaptive garbage collection scheduler with an operation time associated with performing the operation; and
    a garbage collector to perform the garbage collection process and to provide the adaptive garbage collection scheduler with a collection time associated with performing the garbage collection process.

14. The apparatus of claim 13, wherein:
the user impact index corresponds to a ratio of a sum of the operation time and the collection time to the delay time, and
the collection urgency is a ratio of memory allocated since a previous invocation of the garbage collection process to a tuning constant corresponding to frequency of invocation of the garbage collection process.

15. The apparatus of claim 13, wherein the tuning constant is approximately equal to 1.5 megabytes.

* * * * *